United States Patent
Albers et al.

[11] Patent Number: 5,823,035
[45] Date of Patent: Oct. 20, 1998

[54] METHOD OF MAKING A COIL SPRING

[75] Inventors: Albert Albers, Bühl; Robert Felger, Bühl-Neusatz, both of Germany

[73] Assignee: Luk Lamellen Und Kupplungsbau GmbH, Bühl, Germany

[21] Appl. No.: 865,265

[22] Filed: May 29, 1997

Related U.S. Application Data

[62] Division of Ser. No. 533,110, Sep. 25, 1995, Pat. No. 5,642,875, which is a continuation of Ser. No. 206,455, Mar. 4, 1994, abandoned.

[30] Foreign Application Priority Data

Mar. 5, 1993 [DE] Germany .................. 43 06 908.8

[51] Int. Cl.⁶ .................. B21D 11/08; B21F 3/02
[52] U.S. Cl. .................................. 72/136; 72/135
[58] Field of Search .................. 72/135, 136, 137, 72/138, 143, 145

[56] References Cited

FOREIGN PATENT DOCUMENTS 266429  4/1950  Czechoslovakia .................. 72/135

*Primary Examiner*—Joseph J. Hail, III
*Assistant Examiner*—Rodney Butler
*Attorney, Agent, or Firm*—Darby & Darby

[57] ABSTRACT

A method of making a coil spring wherein the external surfaces of the convolutions have cylindrical major portions and flats which abut the neighboring convolutions when a spring is compressed flat under load. This reduces the likelihood of radial displacement of one or more convolutions under load and the likelihood of a reduction of the axial length of the coil spring when in its unstressed condition subsequent to being repeatedly compressed flat under load. The external surface of each convolution can be provided with one or two flats, and the planes of the two flats preferably make a small acute angle if the coil spring is caused to assume an arcuate shape when in actual use.

31 Claims, 1 Drawing Sheet

METHOD OF MAKING A COIL SPRING

CROSS-REFERENCE TO RELATED CASES

This is a division of the patent application Ser. No. 08/533,110 filed Sep. 25, 1995, now U.S. Pat. No. 5,642,875 granted Jul. 1, 1997, which is a continuation of Ser. No. 08/206,455 filed Mar. 04, 1994, now abandoned.

BACKGROUND OF THE INVENTION

The invention relates to improvements in coil springs and, more particularly, to improvements in coil springs which can be utilized with advantage in power trains between prime movers and driven parts, such as between an engine and the wheels in a motor vehicle.

It is already known to make a coil spring from round, square or rectangular wire, i.e., of wire having a truly circular or a truly polygonal cross-sectional outline. A drawback of coil springs having a truly circular cross-sectional outline is that neighboring convolutions of such springs are likely to slide relative to each other in the radial direction of the convolutions when the springs are compressed flat under load, i.e., when the neighboring convolutions actually abut each other so that the entire spring acts or is supposed to act not unlike a solid block.

A drawback of heretofore known coil springs having a polygonal (such as a square or rectangular) cross-sectional outline is that the edges between the mutually inclined portions of the external surface of one convolution are likely to and often do abut the flat portions of the external surfaces of neighboring convolutions. This can result in damage to the spring and/or in even more pronounced radial displacement of a convolution relative to the neighboring convolution or convolutions when the spring is used as a compression spring and is stressed to such an extent that the neighboring convolutions actually contact and bear against each other.

OBJECTS OF THE INVENTION

An object of the invention is to provide a novel and improved method of making coil springs of the type having convolutions which are less likely to move radially relative to each other when the spring is compressed flat under load than conventional coil spring.

Another object of the invention is to provide a method of making a compression coil spring which can be subjected to pronounced loads without risking radial movements of neighboring convolutions relative to each other.

A further object of the invention is to provide a method of making a coil spring which can store large amounts of energy without undergoing undesirable deformation.

An additional object of the invention is to provide a method of making a coil spring which can be used as a superior substitute for heretofore known coil springs.

Still another object of the invention is to provide a method of making a coil spring wherein only predetermined portions of external surfaces of neighboring convolutions can come into actual contact with each other in response to the application of a load which suffices to compress the spring flat so that the external surfaces of neighboring convolutions actually contact and bear against each other.

A further object of the invention is to provide a method of making a coil spring with convolutions having novel cross-sectional outlines.

Another object of the invention is to provide novel and improved devices which employ one or more coil springs which are produced in accordance with the above-outlined method.

An additional object of the invention is to provide a friction clutch which employs one or more coil springs produced in accordance with the above-outlined method.

Still another object of the invention is to provide a torque transmitting device which employs one or more coil springs produced in accordance with the above-outlined method.

Another object of the invention is to provide a simple and inexpensive method of making coil springs.

An additional object of the invention is to provide a method of making novel and improved compression coil springs.

Still another object of the invention is to provide a simple and inexpensive method of making coil springs which can be practiced by resorting to in available machines.

SUMMARY OF THE INVENTION

One feature of the present invention resides in the provision of a method of making a coil spring which can be utilized with advantage in torsional vibration dampers in power trains of motor vehicles. The improved coil spring comprises a plurality of neighboring convolutions which are movable toward and against each other when the spring is under load and is used as a compression spring. The convolutions have external surfaces each including an elongated substantially cylindrical major portion and at least one elongated facet or flat or platform which abuts a neighboring convolution when the spring is under load while being used as a compression spring.

The at least one flat can have a width in the range of between 0.3 mm and 3 mm.

The flats of the external surfaces are preferably spaced apart from the centers of curvature of the respective cylindrical major portions by distances in the range of between r–0.05 mm and r–0.4 mm, wherein r is the radius of a cylindrical major portion.

The external surface of each convolution can be provided with two flats each of which abuts a flat of the external surface of a neighboring convolution when the spring is under load and is used as a compression spring. The flats of the external surface of each convolution can be at least substantially parallel to each other. Alternatively, the flats of the external surface of each convolution can be disposed in planes making a small acute angle, preferably an acute angle which is between 0.5° and 6°, most preferably between 1° and 4°.

Each flat can have a concave shape.

The convolutions of the improved coil spring can be oriented relative to each other in such a way that they together form an arc even when the spring is not under load. The arc can equal or approximate the arc which is formed by the convolutions when the spring is in actual use, e.g., in an annular chamber of a torque transmitting device.

The axial length of the helical body which is formed by the convolutions of the improved coil spring is or can be a multiple of the diameter of a convolution.

Another feature of the present invention resides in the provision of a method of making torque transmitting device which comprises coaxial first and second components (e.g., the first and second flywheels of a composite flywheel between the engine and the friction clutch of a motor vehicle). At least one of the two components is rotatable relative to the other component in first and second directions and the improved torque transmitting device further comprises a coil spring which is produced accordance with the novel method and is interposed between the two components to store energy in response to rotation of the at least one component relative to the other component in one of the first and second directions. The spring comprises a plurality of convolutions which move toward and ultimately against each other in response to rotation of the at least one component, in the one direction relative to the other component, to prevent further rotation of the at least one component, in the one direction relative to the other component, when the neighboring convolutions of the spring move against (i.e., into actual contact with) each other. The convolutions have external surfaces each of which includes an elongated substantially cylindrical major portion and at least one flat or facet or platform which abuts a neighboring convolution when the convolutions are moved against each other.

The components and the spring can form part of a torsional vibration damper, e.g., a vibration damper which constitutes a composite flywheel. Alternatively, the two components and the spring can constitute or form part of a composite clutch plate or clutch disc for use in a friction clutch for motor vehicles.

The novel method comprises the steps of imparting to an external surface of an elongated hardened metallic wire (e.g., a wire made of spring steel) a configuration including an elongated, at least substantially cylindrical major portion, and at least one elongated flat or facet or platform, and converting the wire into a coil spring with a plurality of neighboring convolutions each having an external surface including a major section forming part of the cylindrical major portion of the external surface of the wire and a smaller section forming part of the flat of the external surface of the wire. The smaller section of the external surface of each convolution abuts a neighboring convolution when the coil spring is under load.

The imparting step can precede the converting step, the converting step can precede the imparting step, or the two steps can be carried out in a simultaneous operation.

The imparting step can include the treatment of the wire in a rolling mill or an analogous machine.

BRIEF DESCRIPTION OF THE DRAWINGS

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawings, wherein:

DESCRIPTION OF PREFERRED EMBODIMENTS

Figure 1:
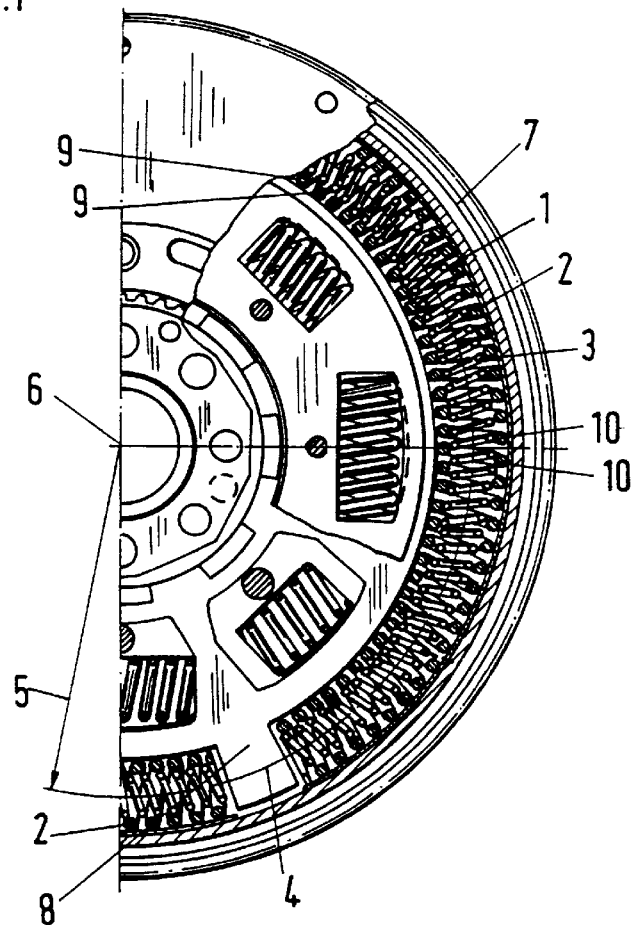
FIG. 1 is a fragmentary schematic, partly elevational and partly sectional, view of a torque transmitting device utilizing coil springs produced in accordance with which embodies the present invention.

FIG. 1 shows a portion of a rotary torque transmitting device which comprises an array 1 of arcuate coil springs including first coil springs 2 and second coil springs 3. Each coil spring 3 is confined in the interior of a coil spring 2. The arcuate longitudinal axes 4 of the coil springs 2 coincide with those of the respective confined coil springs 3, and the center of curvature 6 of each such arcuate axis coincides with or is at least very close to the rotational axis of the torque transmitting device. The radius of curvature of one of the arcuate axes is shown at 5.

It is presently preferred to shape the coil springs 2 and 3, or at least the coil springs 2, in such a way that the curvature of their axes 4 need not be changed at all, or need not be changed appreciably, during insertion into their chamber within the torque transmitting device of FIG. 1. In other words, the radius of curvature of a coil spring 3 and/or of a coil spring 2 prior to insertion into the aforementioned chamber at least approximates the radius of curvature 5 which is shown in FIG. 1. However, such shaping of the springs 3 and/or 2 prior to insertion into the torque transmitting device is not critical, i.e., it is equally within the purview of the invention to employ substantially straight or slightly arcuate coil springs or even coil springs with axes whose curvature is more pronounced than that of the springs 2 and 3 shown in FIG. 1.

Each of the illustrated coil springs 2 and 3 has an axis 4 which extends along an arc only slightly less than 180°, i.e., each such axis can be said to approximate one half of a circle having a radius 5.

Figure 3:
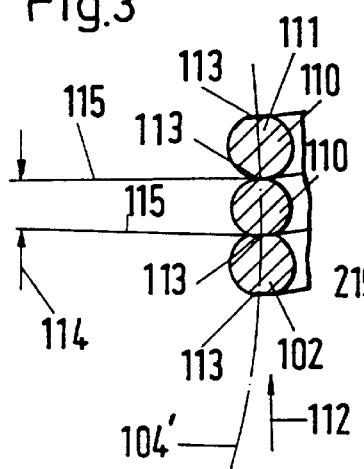
FIG. 3 is a fragmentary axial sectional view of one embodiment of a coil spring which can be utilized in the device of FIG. 1.

The illustrated coil springs 2 and 3 are installed in an annular chamber which is defined by a first rotary component 7 and a coaxial second rotary component 8. The component 7 can be rotated relative to the component 8 and/or the component 8 can be rotated relative to the component 7 in such direction that the two components compress the convolutions 10 of the springs 2 and 3 to an extent such that the radially inner portions 9 of neighboring convolutions actually abut the adjoining convolutions. In other words, the arrangement is or can be such that the springs 3 and/or 2 can be compressed flat under load. Reference may be had to FIG. 3 showing three neighboring convolutions 110 of a spring 102 which is configurated in accordance with the present invention. The external surface of the median convolution 110 of FIG. 3 actually contacts the external surfaces of the two neighboring convolutions 110.

Figure 2:
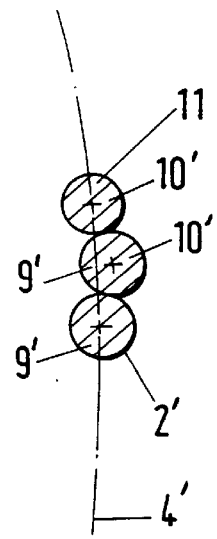
FIG. 2 is a fragmentary axial sectional view of a conventional coil spring with convolutions having circular cross-sectional outlines.

FIG. 2 illustrates a portion of a conventional compression coil spring 2' having an arcuate axis and including convolutions 10' with radially inner portions 9'. The conventional spring 2' is obtained by convoluting a wire 11 having a circular cross-sectional outline, i.e., the wire 11 is round. The neighboring convolutions 9' abut each other because the conventional spring 2' has been compressed flat under load. The center of the cross-section of the median convolution 10' shown in FIG. 2 has been shifted to the right beyond an ideal position in which the external surfaces of the illustrated convolutions 10' would be in mere linear contact with each other and in which the centers of all three cross-sections shown in FIG. 2 would be located on the arcuate line 4', namely a line which is parallel to the arcuate axis of the spring 2' of FIG. 2. Such shifting or squeezing out of the median convolution 10' of FIG. 2 beyond (i.e., to the right of) the desired or ideal position took place in automatic response to full or maximum compression of the spring 2' under load. Deformation or radial displacement of the median convolution 10' of FIG. 2 to the illustrated position results in the development of additional stresses which can entail, and frequently entail, premature damage to (particularly breakage of) the conventional coil spring 2'.

The primary reason for shifting of the median convolution 10' to the position of FIG. 2 is that the cylindrical external surface of the median convolution 10' abuts two identical cylindrical external surfaces of the two outer convolutions 10' of FIG. 2. If one of the convolutions 10' is only slightly out of ideal alignment with the neighboring convolutions 10' of a conventional coil spring 2', the median convolution is even more likely to move toward and to (or even beyond) the position of FIG. 2, and such displacement can take place even prior to complete flattening of the spring 2'. This will be readily appreciated by bearing in mind that any, even minor, misalignment of one of the illustrated convolutions 10' relative to the adjacent convolution or convolutions will result in the generation of stresses as soon as a misaligned convolution contacts the neighboring convolution or convolutions whereby the cylindrical external surfaces of the contacting convolutions 10' slide relative to each other to induce immediate and pronounced shifting to a position of an even more pronounced misalignment.

It is further to be borne in mind that FIG. 2 merely shows the radially inner portions of the convolutions 10', i.e., the illustrated convolutions 10' are in a little more than mere point contact with each other, and this further increases the likelihood of shifting of one or more convolutions away from ideal radial positions with attendant pronounced increase of stresses which contribute to more rapid breakage of the conventional coil spring.

Another drawback of the conventional coil spring 2' with convolutions 10' made of wire 11 having a circular cross section is that pronounced compression of the spring can entail a flattening of abutting portions of external surfaces of the convolutions under an excessive load. The cross sections of flattened convolutions can be said to resemble ellipses. The thus developed stresses entail a shortening of the coil spring 2', i.e., the axial length of the coil spring upon relaxation of the compressive stress to zero is less than the axial length of a new spring 2'. Since the axial length of a compressed coil spring must be accurately related to the dimensions and positions of certain other parts of a machine, apparatus, instrument or other device in which the coil spring is put to use, and since the axial length of a repeatedly compressed coil spring 2' whose convolutions 10' were deformed as a result of the application of excessive loads is insufficient, repeated compression entails damage to or a destruction of the other parts. For example, if a conventional coil spring 2' is put to use in a torque transmitting device of the type shown in FIG. 1, some (even slight) flattening of the external surfaces of the convolutions 10' might result in excessive angular displacement of the rotary components 7 and 8 relative to each other. This can result in serious damage to certain other parts of the torque transmitting device and/or to other parts of a power train in which the torque transmitting device is put to use.

The three neighboring convolutions 110 of the novel coil spring 102 which is shown in FIG. 3 have radially inner portions which abut each other in planes extending substantially radially of the arcuate line 104'. The arcuate line 104' is concentric with the arcuate axis (corresponding to the axis 4 of FIG. 1) of the coil spring 102. Thus, the spring 102 is assumed to have been compressed flat under load. The arrow 112 denotes the direction of application of load (e.g., by the rotary component 8 of FIG. 1) to the lowermost convolution 110 of FIG. 3.

Each of the convolutions 110 has an external surface forming an elongated part of the outline of the wire 111 and including a major portion which has a generally cylindrical cross-sectional outline with two relatively small deformed portions in the form of flats, facets or platforms 113 (hereinafter called flats for short). The flats 113 are located at least substantially diametrically opposite each other in planes 115 which include the center of curvature of the line 104', i.e., the center of curvature of the axis of the improved coil spring 102. The latter is assumed to have an arcuate shape prior to insertion into the chamber of a torque transmitting device or the like, i.e., the curvature of the axis of the spring 102 need not be changed, or need not be appreciably changed, prior to or during insertion between the coaxial rotary components (such as 7 and 8) of a torque transmitting device.

It often suffices to provide each convolution 110 of the improved coil spring 102 with a single flat 113 or to provide each second convolution 110 with two flats as shown in FIG. 3. The illustrated flats 113 on the convolutions 110 of the spring 102 are oriented in such a way that the two flats 113 of the median convolution 110 abut the neighboring flats 113 of the two outer convolutions 110 of FIG. 3. Analogously, the upper flat 113 of the uppermost convolution 110 of FIG. 3 can abut the adjacent flat of a further convolution (not shown) and the lower flat 113 of the lowermost convolution of FIG. 3 can abut the adjacent flat of a neighboring convolution (not shown), and so forth. Thus, the illustrated convolutions 110 lie flat against each other when the spring 102 is in fully compressed condition. This greatly reduces the likelihood of displacement of one or more convolutions radially of the arcuate line 104', i.e., the improved coil spring is less likely to undergo premature destruction and/or to have its axial length reduced in response to repeated application of loads which cause the radially inner portions of the convolutions 110 to abut each other.

The illustrated flats 113 of each convolution 110 shown in FIG. 3 make relatively small acute angles 114 with apices which are or which can be close to the center of curvature of the axis of the spring 102. The magnitude of the illustrated angle 114 depends upon the length of the radius of curvature of the axis of the spring 102. The illustrated angle 114 equals or approximates 3° but can be larger or smaller. It is presently preferred to incline the planes 115 relative to each other at an angle of between 0.5° and 6°, most preferably at an angle of between 1° and 4°. Each of the mutually inclined planes 115 preferably includes or is at least close to the common axis of the components (such as the rotary components 7, 8 in the torque transmitting device of FIG. 1) which stress the spring 102. Thus, if the spring 102 corresponds to one of the springs 2 or 3 shown in FIG. 1, each of the planes 115 includes or is at least close to the center of curvature 6 of an arcuate axis 4.

An important advantage of the improved coil spring 102 is that, when the spring is compressed flat under load, its convolutions 110 are not subjected to any, or are subjected only to minimal, radial stresses which would tend to shift one or more convolutions radially of the spring, e.g., to a position corresponding to that of the median convolution 10' shown in FIG. 2. Another important advantage of convolutions 110 each of which is provided with one or more flats 113 is that the pressure per unit area of the region of contact between a pair of neighboring convolutions 110 in fully stressed (compressed) condition of the spring 102 is reduced accordingly. Thus, such configuration of the spring 102 ensures that each of its convolutions is in a pronounced surface-to-surface (rather than linear) contact with the neighboring convolution or convolutions. Furthermore, the provision of one or more flats 113 on each convolution 110 of a spring 102 ensures that the spring is capable of taking up and withstanding highly pronounced stresses, namely stresses which would entail a flattening of abutting surfaces of convolutions of the type shown in FIG. 2, i.e., convolutions having a circular cross-sectional outline without one or more flats. Moreover, the improved coil spring is capable of taking up abruptly developing compressive stresses, i.e., stresses of a magnitude which causes neighboring convolutions 110 to abruptly impact against each other. It has been found that even such abrupt and very pronounced compression of the spring 102 fails to cause any noticeable or deleterious changes of the cross-sectional area of its wire 111. Since the cross-sectional area of the wire 111 does not change, the axial length of the spring 102 in unstressed condition is the same regardless of the frequency at which the spring is compressed flat under load. This reduces the likelihood of damage to other parts of the machine, apparatus, instrument or any other device in which the improved spring is put to use.

Figure 4:
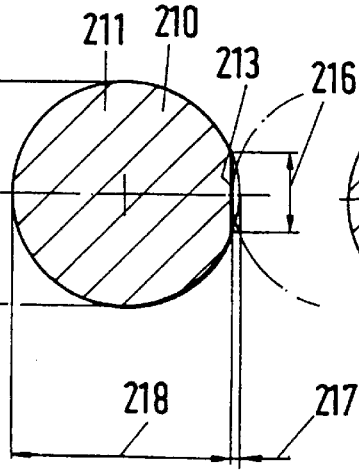
FIG. 4 is an enlarged axial sectional view of one convolution of a modified coil spring.

FIG. 4 is a greatly enlarged cross-sectional view of one convolution 210 of a coil spring which embodies another form of the present invention. Thus, the convolution 210 has a single flat 213 having a width 216 which is a small fraction of the diameter 219 of the cylindrical major portion of the external surface of the convolution. Consequently, the wire 211 of which the convolution 210 is made even more closely resembles a conventional round wire 11 (FIG. 2) than the wire 111 of the coil spring 102 which is shown in FIG. 3. The cylindrical major portion of the external surface of an adjoining convolution 210 is shown in FIG. 4 adjacent the flat 213; such major portion is in linear contact with the flat 213 in the fully compressed condition of the spring embodying the convolutions 210. It has been found that, in many instances, the provision of a single flat 213 suffices to greatly reduce the likelihood of radial shifting of one or more convolutions 210 when the coil spring is compressed flat under load, i.e., when the coil spring acts not unlike a solid block. It was further ascertained that a coil spring having convolutions 210 of the type shown in FIG. 4 is also unlikely to have its maximum length (in the unstressed condition) reduced to less than the maximum length of a new coil spring, even after a number of repeated compressions of the spring to an extent which is necessary to ensure that the radially inner portions of neighboring convolutions 210 actually abut each other.

If a coil spring having convolutions of the type shown in FIG. 3 or 4 is put to use in vibration damping torque transmitting devices, the width of an elongated flat 113 or 213 can be in the range of between 0.3 mm and 3 mm, preferably between 0.5 mm and 2 mm. The distance between the central part of a flat 113 or 213 and the center of the respective convolution 110 or 210 is normally reduced by between 0.05 mm and 0.4 mm. In other words, if the radius of the cross section of the convolution 210 shown in FIG. 4 is r, the minimum distance between the flat 213 and the center of the cross-section of the cylindrical major portion of the external surface of the convolution 210 (the flattening is shown at 217) can be between r−0.05 mm and r−0.4 mm. Otherwise stated, the difference between the diameter 219 of the cylindrical major portion of the external surface of the convolution 210 and the distance 218 (such distance equals the diameter 219 minus the distance 217) can be extremely small. For example, the distance 218 can be in the range of between 85 percent and 98 percent of the diameter 219.

Figure 5:
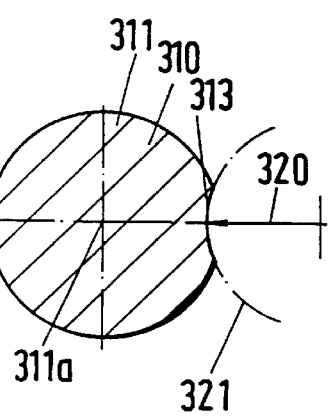
FIG. 5 is a similar enlarged axial sectional view of one convolution of a further coil spring.

FIG. 5 illustrates one convolution 310 of a further novel coil spring which is made of metallic wire (e.g., of spring steel). The external surface of the convolution 310 includes a major cylindrical portion extending along an arc not much less than 360° and a single flat 313 which is concave. In other words, the distance of the central portion of the flat 313 from the center of curvature 311a of cylindrical major portion of the external surface of the convolution 310 (FIG. 5) is less than the corresponding distance of the central portion of the flat 213 from the center of curvature of the outline of the major portion of the external surface of the convolution 210 (FIG. 4). An advantage of the concave flat 313 is that it further reduces the likelihood of any undesired radial displacement of neighboring convolutions 310 relative to each other when the coil spring embodying such convolutions is compressed flat under load. Therefore, the concave flat 313 is particularly desirable when the external surface of each convolution of a coil spring has a single flat. The reference character 320 denotes the radius of curvature of the concave flat 313, and this radius preferably matches or at least approximates the radius of curvature of the cylindrical major portion of the external surface of a convolution 310. This ensures that the cylindrical major portion 321 of the external surface of a convolution which is adjacent to and is located to the right of the convolution 310 of FIG. 5 lies flush against the entire concave flat 313 when the coil spring including a number of convolutions 310 is compressed flat under load. It will be readily appreciated that convolutions 310 of the type shown in FIG. 5 are even less likely to move radially relative to each other when the coil spring is compressed to such an extent that the major portion 321 of the external surface of a first convolution is caused to abut the entire concave flat 313 of a neighboring convolution.

The configurations which are shown in FIGS. 3, 4 and 5 can be imparted to the external surfaces of wires 111, 211 and 311 during the making of such wires, e.g., in a rolling mill. However, it is equally possible (and often preferred) to employ a standard round wire (e.g., a wire made of spring steel) which is cold formed in a suitable machine or production line to impart to its external surface one or more flats 113, 213 or 313. For example, a standard wire which has already undergone the necessary treatment to exhibit a desired resiliency can be advanced through a rolling station to be provided with one or more elongated flats which are to constitute the flats 113, 213 or 313 of coil springs having convolutions of the type shown in FIGS. 3, 4 and 5. Still further, it is possible to employ a standard round wire (such as the wire 11 shown in FIG. 2) and to provide the wire with flats 113, 213 or 313 (or analogous flats) by removing some material from the wire, e.g., in a grinding machine.

It is also within the purview of the invention to provide a standard wire 11 with flats 113, 213 or 313 during winding of such wire to form the convolutions 110, 210 or 310. Such mode of making the flats is preferred in many instances because the flats are more likely to confront the adjacent portions of the external surfaces of neighboring convolutions 110, 210 or 310 i.e., to assume predetermined positions relative to the adjacent convolutions. Thus, and referring again to FIG. 5, the cylindrical major portion 321 of the external surface of a convolution which is located to the right of the convolution 310 is more likely to lie flush against the flat 313 if such flat is formed during conversion of the wire 311 into convolutions 310. The same applies for the flats 113 and 213. Furthermore, such mode of making the flats contributes to lower cost of the improved coil springs because the convoluting operation is carried out simultaneously with the (deforming) step of making the flats. Moreover, such mode of making the flats renders it possible to mass produce the novel coil spring by utilizing standard wire which is available for the making of coil springs. Thus, a convoluting machine which is designed to convert standard wire 11 into coil springs consisting of or containing convolutions 110, 210 or 310 (or analogous convolutions) can receive standard wire directly from a wire making machine.

The improved coil spring is susceptible of numerous additional modifications without departing from the spirit of the present invention. For example, the conversion of a length of standard round wire 11 into coil springs having convolutions 110, 210 or 310 (or analogous convolutions) can result in some deformation of the wire so that the major portion of the external surface of a convolution will have a slightly oval (rather than an ideal cylindrical) cross-sectional outline. It is also possible to utilize a wire which has an oval cross-sectional outline prior to the making of flats 113 213, 313 or analogous flats. Still further, the making of the flats simultaneously with or prior to the convoluting step can result in the provision of rounded transitions between the marginal portions of a flat 113, 213 or 313 and the adjacent marginal portion of the cylindrical major portion of the external surface of a convolution 110, 210 or 310. Moreover, such transition zones between the flats and the cylindrical major portions of the external surfaces of the convolutions 110, 210 or 310 can contain some accumulations of the material of the wire.

A coil spring which is provided with one or more flats of the type shown in FIGS. 3 to 5, or with similar flats, exhibits the advantage that its work capacity is superior to that of a spring which is made of the same starting material (wire) but without one or more flats. For example, the spring travel of a coil spring embodying the present invention is superior to that of a coil spring which is made of the same starting material (such as round wire), which has the same number of convolutions and wherein the diameter of each convolution matches that of a convolution forming part of the improved spring. Further, an improved coil spring having a given number of convolutions and a given length can be made of a wire having a larger cross-sectional outline (i.e., a larger diameter) than a conventional coil spring having the same number of convolutions and the same length because the making of one or more flats on a wire having a relatively large diameter compensates for the normally existing stroke loss or travel loss. This increases the work capacity of the improved coil spring for a given spring travel in comparison with the work capacity of a conventional coil spring (made of a round wire) for the same work travel. The stresses, especially the shearing stress, in a wire which has been converted into an improved coil spring remain substantially unchanged. It has been ascertained that any increase of shearing stress is small or negligible, especially when compared with the increased work capacity. The possibility of making the improved coil spring from a wire having a relatively large diameter is desirable and advantageous because the spring rate or spring gradient of the improved coil spring is more satisfactory, the same as the spring bias upon completion of maximum spring travel. The more satisfactory work capacity of the improved coil spring (in comparison with the work capacity of a conventional coil spring) renders it possible to dispense with a second or inner spring (such as the inner springs 3 in the device of FIG. 1).

Another important advantage of the improved coil spring is that it can be repeatedly subjected to stresses which result in maximum compression so that the neighboring convolutions having external surfaces with one or more flats and substantially cylindrical major portions actually abut and bear against each other. This does not result in undesirable radial shifting of the convolutions relative to each other and/or in undesirable reduction of the axial length of the coil spring in the unstressed condition. In other words, the improved coil spring can store large amounts of energy for extended periods of time and/or at frequent intervals without affecting its useful life. Furthermore, the improved coil spring can be made of standard wire in a simple and time saving operation by deforming the external surface of the wire to provide it with one or more longitudinally extending flats prior to or in the course of the convoluting or converting step. The flats reliably prevent migration of one or more convolutions of the improved coil spring radially of the axis of the spring regardless of whether the neighboring convolutions bear against each other with a small force or with a high force when the spring is compressed flat under load. This is due to the fact that the flats prevent the generation of any, or any appreciable, forces which would tend to move one or more convolutions radially outwardly or inwardly from its desired optimum position when the neighboring convolutions of the improved coil spring abut each other.

A coil spring having convolutions 110 of the type shown in FIG. 3 can be utilized with particular advantage in a host of devices wherein the convolutions are urged against each other by a large force when the spring is already compressed flat under load. The reason is that the pressure per unit area of the flats 113 which abut each other in fully compressed condition of the spring is much less than if the convolutions are maintained in mere linear contact as shown in FIG. 2.

When the improved coil spring is put to use in a power train between the output element of an engine and a transmission of a motor vehicle, the diameter of the wire 111, 211 or 311 is or can be in the range of between 1.5 mm and 8 mm, preferably between 2 mm and 6 mm. As already mentioned above, the width of a flat can be in the range of between 0.3 mm and 3 mm, preferably between 0.5 mm and 2 mm, and the distance 217 (FIG. 4) can be in the range of between 0.05 mm and 0.4 mm. Such coil springs can be utilized with advantage in clutch discs or clutch plates, e.g., in clutch discs of the type described and shown in commonly owned U.S. Pat. No. 5,161,660 granted Nov. 10, 1992 to Huber. Furthermore, such coil springs can be utilized in composite flywheels of the type described and shown, for example, in commonly owned U.S. Pat. No. 5,042,632 granted Aug. 27, 1991 to Jäckel, in commonly owned U.S. Pat. No. 4,989,710 granted Feb. 5, 1991 to Reik et al., and in commonly owned U.S. Pat. No. 5,160,007 granted Nov. 3, 1992 to Reik et al. The disclosures of the above enumerated patents are incorporated herein by reference.

As can be seen in FIG. 4, the width (216) of a flat (213) can be a relatively small or minute fraction of the diameter (219) of the cylindrical major portion of the external surface of the wire (211) which is converted into convolutions (210). As already mentioned above, the ratio of the distance 218 to the diameter 219 can be in the range of between 0.85 and 0.98 to one, particularly between 0.92 and 0.98 to one. Thus, by far the major portion of the external surface of the wire can have a circular or nearly circular cross-sectional outline.

Coil springs having convolutions 110 of the type shown in FIG. 3 can be utilized with particular advantage in devices wherein the axis (note the axis 4 in FIG. 1) of an installed coil spring has an arcuate shape. Even though the planes 115 can be at least substantially parallel to each other, the making of the flats 113 in such a way that their planes make a small acute angle (of between 0.5° and 6°, preferably between 1° and 4° renders it possible to subject the convolutions 110 to very pronounced stresses while the respective spring is already compressed flat under load. The mutual inclination of the planes 115 is normally selected with a view to ensure that the flats 113 of neighboring convolutions lie flush against each other when the neighboring convolutions are caused to abut one another (as actually shown in FIG. 3). The length of a coil spring having one or more flats can be a multiple of the median diameter of one of its convolutions. For example, the axial length of an unstressed coil spring having convolutions of the type shown in FIGS. 3, 4 and 5 can be between 2.5 and 30 times, preferably in the range between 3 and 10 times, the median diameter of a convolution 110, 210 or 310.

The invention can be embodied in helical as well as in conical coil springs. The inclination of the planes of flats depends on the type of coil springs, i.e., whether or not all of the convolutions have identical diameters.

In addition to the previously described preferred utilizations of the improved coil springs in devices wherein the spring is normally or frequently compressed flat under load, such springs can be utilized with advantage in devices of the type described and shown in published German patent application Serial No. 41 17 584, in published German patent application Serial No. 37 21 712, in published German patent application Serial No. 42 13 341, in published German patent application Serial No. 42 25 304 and in published German patent application Serial No. 42 25 314. These are but a few examples of devices in which the improved coil spring can be put to use.

Complete prevention of undesired radial displacement of convolutions forming part of an arcuate spring when the spring is compressed flat under load (or at least a pronounced reduction of the likelihood of such radial displacement) is particularly important when the spring has an arcuate shape. For example, and referring again to FIG. 1, if the springs 2 and 3 are shaped in accordance with the present invention, certain convolutions of the springs 2 are much less likely to move radially outwardly relative to the neighboring convolutions and to move into frictional engagement with the rotary component 7. Analogously, certain convolutions of the springs 3 are much less likely to move radially outwardly relative to the neighboring convolutions of such springs to bear against the radially outer portions of convolutions forming part of the respective springs 2. Even though only the radially inner portions of convolutions forming part of an arcuate coil spring actually bear against each other when the spring is compressed flat under load, numerous experiments indicate that the convolutions cannot move radially relative to the neighboring convolutions if the convolutions are facetted in a manner as described with reference to FIGS. 3, 4 and 5.

If the improved spring is made of round wire (such as the wire 11 shown in FIG. 2), i.e., if the wire is provided with flats in the coiling machine or at a station between the wire making and coiling machines, successive increments of the wire are preferably tested for the presence of cracks which could shorten the useful life of the corresponding springs. Such testing can be carried out prior to coiling of the wire, or the spring can be made of wire which has been tested for the presence or absence of cracks at the wire making plant. This is due to the fact that the making of one or more flats involves a relatively small deformation of the wire. However, it is also possible to monitor the wire for the presence or absence of cracks subsequent to the provision of one or more flats; this is due to the fact that the making of flats does not affect the shape of the major portion of the external surface of a convolution, i.e., the wire still remains substantially round so that it can be tested for the presence or absence of cracks by resorting to available testing equipment.

The ability of the improved coil spring to reassume its original length upon being repeatedly compressed flat under load is due to the fact that, even if the neighboring convolutions are caused to abruptly impinge upon each other in response to the sudden application of a considerable load, the resulting deformation of their external surfaces as a consequence of the sudden impact is nil or negligible. This is important in many instances, for example, when one or more coil springs must reliably prevent any further angular displacement of two relatively rotatable components when such components assume predetermined angular positions relative to each other irrespective of whether a first component was rotated relative to a second component, whether the second component was rotated relative to the first component or whether the first and second components were rotated with respect to one another.

The method of making the improved spring can include only the steps of imparting to the external surface of a round wire a configuration including the provision of one or more longitudinally extending flats (such as 113, 213 or 313) and of thereupon converting (coiling) the wire to obtain a series of coil springs having convolutions of the type shown in FIGS. 3, 4 and 5. It is also possible to resort to a further step, namely to thermal treatment of the wire or to thermal treatment of finished springs in order to reduce or eliminate localized internal stresses which are likely to develop in the wire as a result of coiling or prior to coiling. Such internal stresses can be very pronounced so that, if not eliminated or weakened, they could affect the useful life of the coil springs.

The invention can be embodied in coil springs with convolutions having external surfaces with predominantly circular cross-sectional outline as well as in coil springs which are made of wire having a polygonal (e.g., rectangular) cross-sectional outline. Two of the four facets of a wire having a rectangular cross-sectional outline are then inclined relative to each other in a manner as shown in FIG. 3 to ensure that at least a portion of the external surface of each convolution lies flush against the external surface of an adjacent convolution even if the coil spring has an arcuate axis, at least when in actual use. The cross-sectional outline of each convolution then resembles a trapezoid.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of making a coil spring, comprising the steps of:

imparting to an external surface of an elongated hardened round spring steel wire a configuration including an elongated, at least substantially cylindrical, major portion and at least one elongated flat, said imparting step including cold forming the wire;

converting the wire into a coil spring with a plurality of neighboring convolutions each having an external surface including a major section forming part of said cylindrical major portion and a smaller section forming part of said flat; and imparting to said spring an arcuate shape so that each of said convolutions includes a radially inner portion and a radially outer portion, said radially inner portions of said neighboring convolutions being nearer to each other than said radially outer portions, said smaller section of the external surface of each convolution abutting a neighboring convolution and opposing radial movements of abutting neighboring convolutions relative to each other when the coil spring is under load in a direction corresponding to said arcuate shape.

2. A method of making a coil spring, comprising the steps of:

imparting to an external surface of an elongated hardened metallic wire of a resilient metallic material a configuration including an elongated, at least substantially cylindrical, major portion and at least one flat; and converting the wire into a coil spring with a plurality of neighboring convolutions each having an external surface including a major section forming part of said cylindrical major portion and a smaller section forming part of said flat, said smaller section of the external surface of each convolution abutting a neighboring convolution and opposing radial movements of abutting neighboring convolutions relative to each other when the coil spring is under load, that portion of each of said convolutions which is provided with the respective flat having a substantially circular cross section with a larger first diameter parallel to and a smaller second diameter transverse to the respective flat, the ratio of said second diameter to said first diameter being between about 0.92 and 0.98 to one.

3. A method of making a coil spring, comprising the steps of:

imparting to an external surface of an elongated hardened wire of a resilient metallic material a configuration including an elongated, at least substantially cylindrical, major portion and a pair of elongated flats; and converting the wire into a coil spring with a plurality of neighboring convolutions each having an external surface including a major section forming part of said cylindrical major portion and a smaller section forming part of the respective pair of flats, said smaller section of the external surface of each convolution abutting a neighboring convolution and opposing radial movements of abutting neighboring convolutions relative to each other when the coil spring is under load, the flats of at least one of said pairs being disposed in planes making an angle of between about 0.5° and 6°.

4. A method of making a coil spring, comprising the steps of:

imparting to an external surface of an elongated hardened wire of a resilient metallic material a configuration including an elongated at least substantially cylindrical, portion and at least one elongated flat; and converting the wire into a coil spring with a plurality of neighboring convolutions each having an external surface including a major section forming part of said cylindrical major portion and a smaller section forming part of said flat, said smaller section of the external surface of each convolution abutting a neighboring convolution and opposing radial movements of abutting neighboring convolutions relative to each other when the coil spring is under load, at least one of said flats having a width in the range of between about 0.3 mm and 3 mm.

5. A method of transforming a resilient wire having a substantially round cross-sectional outline into a coil spring having a plurality of neighboring convolutions each including an elongated part of said outline, comprising the steps of deforming portions of said parts, including providing said substantially round cross-sectional outline with two flats which are disposed at least substantially diametrically opposite each other and are at least substantially parallel to each other; and converting the wire into said convolutions wherein the deformed portions of the elongated parts are disposed in predetermined positions relative to each other to oppose radial movements of neighboring convolutions relative to each other when the coil spring is under load so that the neighboring convolutions contact each other.

6. The method of claim 5, wherein the coil spring is a compression coil spring.

7. The method of claim 5, wherein one of said steps precedes the other of said steps.

8. The method of claim 5, wherein said deforming step takes place at least substantially simultaneously with said converting step.

9. The method of claim 5, wherein at least one of said steps includes plastic deformation of the wire.

10. The method of claim 5, wherein said converting step is carried out in a coiling machine and said deforming step is carried out in a rolling mill.

11. The method of claim 10, wherein said deforming step is carried out at a station for the performance of said converting step.

12. The method of claim 5, wherein said converting step includes imparting to the spring an arcuate shape so that said convolutions have radially inner and radially outer portions, said deforming step including displacing portions of the wire at one of said radially inner and radially outer portions of at least some of said convolutions.

13. The method of claim 12, wherein said displacing step includes displacing portions of the wire at said radially inner portions of said at least some convolutions.

14. The method of claim 5, further comprising the step of hardening the wire prior to at least one of said deforming and converting steps.

15. The method of claim 5, wherein the wire is a standard wire.

16. The method of claim 5, wherein said deforming step precedes said converting step.

17. The method of claim 5, wherein said deforming step is carried out in a rolling machine prior to said converting step.

18. The method of claim 5, further comprising the step of subjecting the spring to a thermal treatment subsequent to said converting step.

19. The method of claim 5, wherein said converting step immediately follows said deforming step.

20. The method of claim 5, wherein said deforming step comprises providing each of said parts with a single deformed portion.

21. The method of claim 20, wherein at least some of said deformed portions are flat.

22. The method of claim 20, wherein at least some of said deformed portions are concave.

23. The method of claim 22, wherein said concave deformed portions have curvatures at least substantially complementary to those of the adjacent parts of the outlines of the respective neighboring convolutions.

24. The method of claim 5, wherein said deforming step includes providing said substantially round cross-sectional outline with two deformed portions disposed in planes making a predetermined angle with each other.

25. The method of claim 5, wherein the spring has a predetermined length and the convolutions have diameters each of which is a small fraction of said predetermined lenth.

26. The method of claim 5, further comprising the step of imparting to the spring an arcuate shape.

27. The method of claim 26, wherein said spring has a curvature at least approximating the curvature of the spring in actual use.

28. A method of making a coil spring, comprising the steps of:
   imparting to an external surface of an elongated hardened wire of a resilient metallic material a configuration including an elongated, at least substantially cylindrical, major portion and at least one elongated flat; and
   converting the wire into a coil spring with a plurality of neighboring convolutions each having an external surface including a major section forming part of said cylindrical major portion and a smaller section forming part of said flat, said smaller section of the external surface of each convolution abutting a neighboring convolution and opposing radial movements of abutting neighboring convolutions relative to each other when the coil spring is under load.

29. The method of claim 28, wherein one of said imparting and converting steps precedes the other of said steps.

30. The method of claim 28, wherein said imparting step includes rolling the flat onto the wire.

31. The method of claim 28, wherein said imparting step takes place simultaneously with said converting step.

* * * * *